United States Patent [19]

Metcalf

[11] Patent Number: 5,330,059
[45] Date of Patent: Jul. 19, 1994

[54] STORING, ORGANIZING AND RETRIEVING DEVICE FOR PROTECTIVE CASES ENCLOSING OPTICAL OR MAGNETIC RECORDING OR RECORDED MEDIA

[76] Inventor: Darrell J. Metcalf, 520 First St., Fillmore, Calif. 93015

[21] Appl. No.: 908,032

[22] Filed: Jul. 6, 1992

[51] Int. Cl.⁵ ............................................. A47F 7/00
[52] U.S. Cl. .................................... 211/40; 211/41; 312/9.53
[58] Field of Search .................... 211/40, 41; 312/9.1, 312/9.9, 9.11, 9.14, 9.23, 9.46, 9.47, 9.48, 9.53, 9.54, 9.56; 206/310, 387

[56] References Cited

U.S. PATENT DOCUMENTS

| | | | |
|---|---|---|---|
| 4,341,307 | 7/1982 | Shyers | 206/387 |
| 4,358,018 | 11/1982 | Wolfe | 211/41 |
| 4,366,903 | 1/1983 | Gaiser et al. | 211/40 X |
| 4,993,558 | 2/1991 | Assael | 211/41 X |
| 5,103,986 | 4/1992 | Marlowe | 211/41 |
| 5,139,320 | 8/1992 | Banker | 312/9.53 |
| 5,161,682 | 11/1992 | Seifert et al. | 211/40 X |
| 5,201,414 | 4/1993 | Kaszubinski | 211/40 X |
| 5,207,717 | 5/1993 | Manning | 206/387 X |

*Primary Examiner*—Robert W. Gibson, Jr.
*Attorney, Agent, or Firm*—Albert O. Cota

[57] ABSTRACT

A device (10) for storing, organizing and retrieving protective cases (70) that enclose optical and magnetic recording or recorded media. The device (10) consists of two major elements: a base member (12) that can be made in various configurations and at one or more protective case positioning members (20) that extend normal from the base member (12). The members (20) have one or more protective case aligning surface and can be made in various cross section configurations with the proviso that their aligning surfaces be formed contiguously and that they be designed to allow a protective case (70) to be slideably aligned between them. The device can also be made with a base member (12) having a case ejecting slot (30) that incorporates a protective-case ejection device (29). Additionally, the device (10) can have alphanumeric indicators placed on selected protective-case positioning members and/or directly on the protective case (70). The case (70) can also include an external, transparent flexible pocket (32) into which may be inserted an alphanumeric coordinating index card (33) to visibly coordinate or organize, one or more cases while engaged in the device.

24 Claims, 6 Drawing Sheets

STORING, ORGANIZING AND RETRIEVING DEVICE FOR PROTECTIVE CASES ENCLOSING OPTICAL OR MAGNETIC RECORDING OR RECORDED MEDIA

TECHNICAL FIELD

The invention pertains to the general field of storing and organizing devices and more particularly to a device for storing and organizing protective cases that enclose optical and magnetic recording or recorded media.

BACKGROUND ART

The use of personal computers and mass media playback units such as compact disc (CD) players and the like is expanding at a high rate. As this expansion continues, the quantity of the optical and magnetic media for operating these units will increase at yet higher rates. As an example of the capacities available in some mass media; one CD-ROM can hold the number of files equivalent to a stack of 3.5 inch floppy disks from the floor to the ceiling. Thus, the need for organizing these mass media in a manner that provides secure storage and quick access to the media is of primary concern.

The mass media are protected by various designs and sizes of protective cases. For example compact discs (CD) which include CD ROM, CD WORM and CD wrightable are packaged in what are referred to as Jewel cases. Other media storage include portable Winchester discs that are contained in removable cartridges and transportable in protective cases that are typically vacuum formed. These mass media cartridges allow large amounts of computer data to be easily maintained, and transported, and allow sensitive data to be safeguarded by simply removing and securing the cartridge. Other mass media protective cases include vacuum-formed and hinged protective cases that are used to protect the ever-present video tapes.

The ability to store, organize and quickly retrieve a particular mass media protective case is a problem that has not been completely solved with currently available storage, organizing and retrieval devices. Many of the available devices provide adequate storage but do not provide a quick method for organizing and retrieving a specific protective case. In particular, a search of prior art literature did not disclose any device that helps a user coordinate a visible index for all the files in combination with a storage device.

Another problem not overcome by the prior art is a economical way to manufacture organizing and retrieval devices. Typically, the manner used to produce these devices is the plastic-injection mold and molding process. The plastic-injection mold is costly and this cost must be recouped in the eventual selling price of each device. The invention described herein overcomes this problem by proposing a cost-effective method to produce separate or continuous parts that may be heat-formed, extruded, or produced in smaller and less expensive injection molds, and the less costly parts may then be attached to one another by means of a simple fabrication process.

DISCLOSURE OF THE INVENTION

The magnetic recording or recorded media storing, organizing and retrieving device is designed to provide a convenient method for storing, organizing and quickly retrieving one or more of the protective cases containing the mass media. In its broadest form, the device consists of a base member having at least two protective-case positioning members that extend normal from the base member. The two positioning members are longitudinally spaced in pairs so that a first positioning member located on one side of the base member, faces a second positioning member located and aligned at the direct opposite side on the base member each positioning member having at least one protective-case alignment surface formed contiguously along a span of the member. Between the paired members is then slideably aligned at least one protective case having opposite edges that are similarly shaped.

The base member may be constructed in various shapes such as a rectangle, square, parallelogram or circle and can be made in any size commensurate with the quantity of protective cases that are to be stored in the device. Likewise, the protective-case positioning members may be made with cross-sections that are circular, semi-circular, square or channeled. The positioning members may also be attached to the base member in a side-by-side design or having a space between them in which case a recess is formed into which is slidably aligned a protective case.

The positioning members are preferably constructed as single units. However, three other construction methods are also disclosed. One such method utilizes two opposite facing and aligned integral structures that extend normal from the base member. Each structure bas a series of continuous indentations that allow a protective case to be placed between two corresponding indentations. The indentations may take the form of various profiles such as sinesoidol, notched, triangular or sawtooth. The second method uses a horizontal section having on each end vertically extending sections that are spaced to allow a protective case to be placed between the two vertically extending sections. The third method makes use of a slot located along the spine of a protective case. In this design, the protective-case positioning member consists of horizontal sections that attach to the base member and a contiguous vertical section that is sized to fit into the slot.

In addition to the device serving as a storage for the protective cases, the device is also designed so that the cases can be easily read for their title and/or contents. Alternatively or in combination, the protective case located at one side of the device can include a transparent flexible pocket into which is inserted an alphanumeric coordinating index card. Further, to add additional utility to the device, a case ejecting slot is transversely located on the base member. The slot serves as an opening into which a protective-case ejecting device can be installed.

In view of the above disclosure, it is the primary object of the invention to provide a mass media storage device that provides convenient storage, allows organization, and quick and easy retrieval of a particular protective case. In addition to the primary object, it is also an object of the invention to provide a device that:

- is adaptable for various types and sizes of media protective cases,
- can be made of various kinds of materials,
- can be made to accommodate from one to a selected quantity of cases,
- may be placed on a flat surface or mounted to a vertical surface, provides for the orderly keeping of the stored cases and, is cost-effective from both a consumer and manufacturer's point of view.

BEST MODE FOR CARRYING OUT THE INVENTION

The best mode for carrying out the invention is presented in terms of a preferred embodiment having various configurations. The invention is designed to facilitate the storage, organizing and retrieval of protective cases 70 that enclose optical and magnetic recording or recorded media such as compact discs, packaged video tapes and removable cartridges such those manufactured by SyQuest Technologies Inc., Iomega Corporation and Ricoh Corporation. The embodiment of the device 10 and its variations as shown in FIGS. 1 through 21, is comprised of two major elements: a base member 12 and an aligned pair of protective-case positioning members 20.

Figure 1:
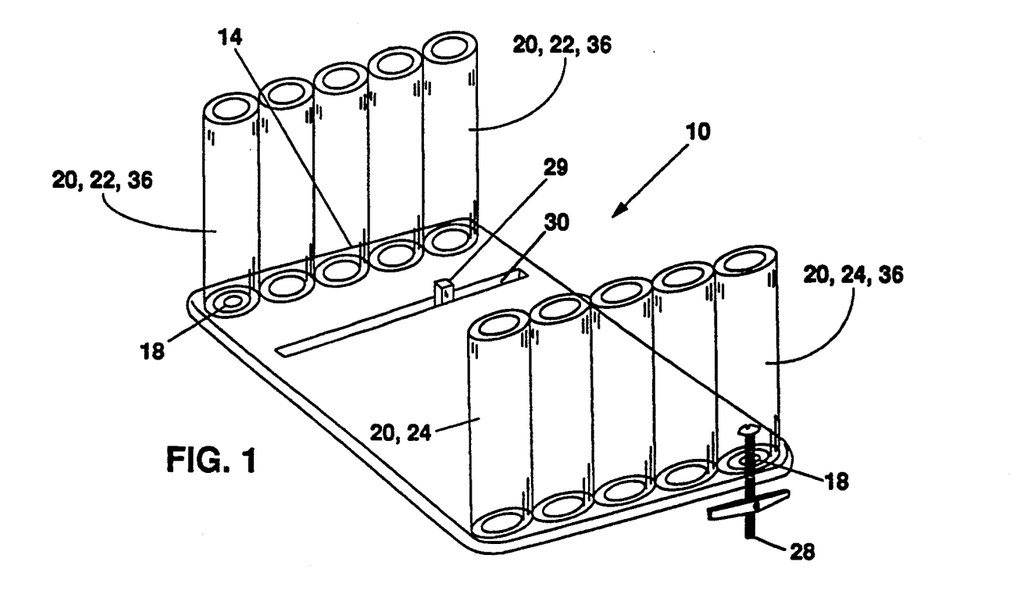
FIG. 1 is a perspective view of a protective case storing, organizing and retrieving device having a rectangular base member and shown without any protective cases aligned between a set of protective-case positioning members, and one or more of the positioning members has a mounting bore located substantially internal to a curved contour defining the adjoining edge at the base of said members.
Figure 2:
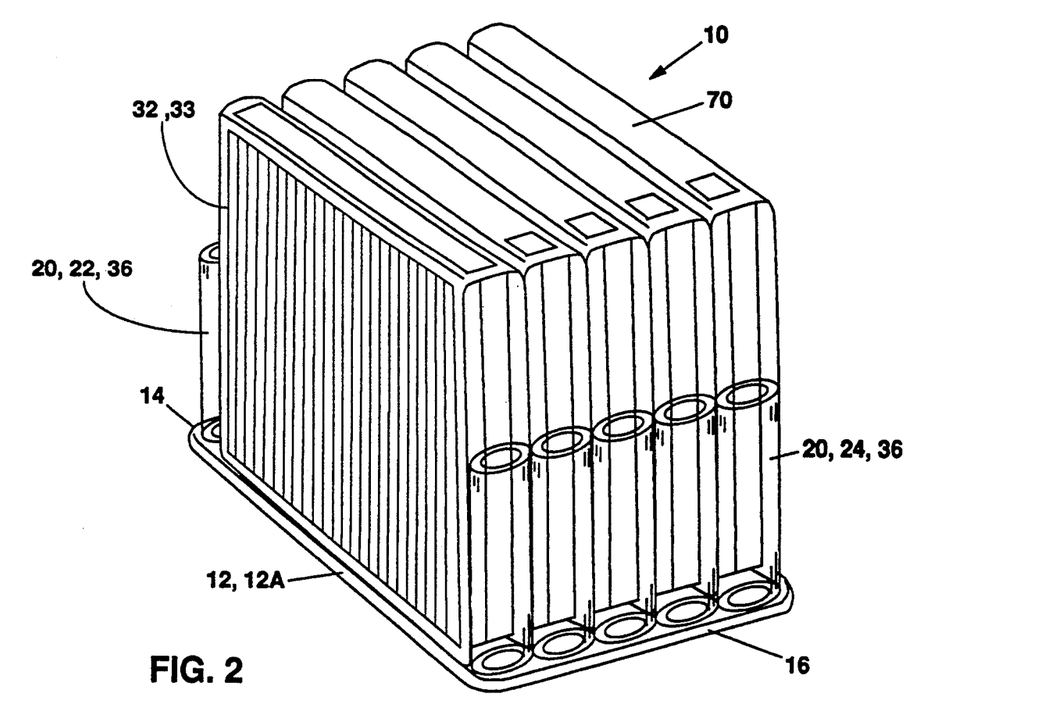
FIG. 2 is a perspective view of the FIG. 1 device shown with protective cases slideably aligned between the protective-case positioning members.
Figure 5:
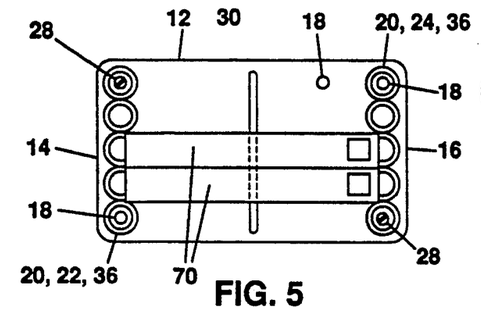
FIG. 5 is a top plan view of the device with a base member having a rectangular shape with contiguous protective-case positioning members and showing the location of a case ejecting slot.

The first configuration of the preferred embodiment as shown in FIGS. 1, 2 and 5 consists of a base member 12 having a rectangular 12A shape that includes a flat surface, a first edge 14 and a parallel second edge 16.

Extending normal from the base member 12 near its first edge 14 is at least one first protective-case positioning member 20,22. The base member 12 also has at least one second protective-case positioning member 20,24. This second member also extends normal from the surface and is located on the opposite side of the base member near the second edge 16 in alignment with the first protective-case positioning member. The first and second members 22, 24 are spaced, as shown in FIGS. 2 and 5, to allow the recessed edges of a protective case 70 to be slideably aligned between them. One or more of the positioning members may have a mounting bore located substantially internal to a curved contour defining the adjoining edge at the base of said members. The bores allow the base member 12 to be firmly attached to horizontal or vertical surface by inserting a fastener 28 through the bores such as a toggle bolt shown in FIG. 1.

Figure 3:
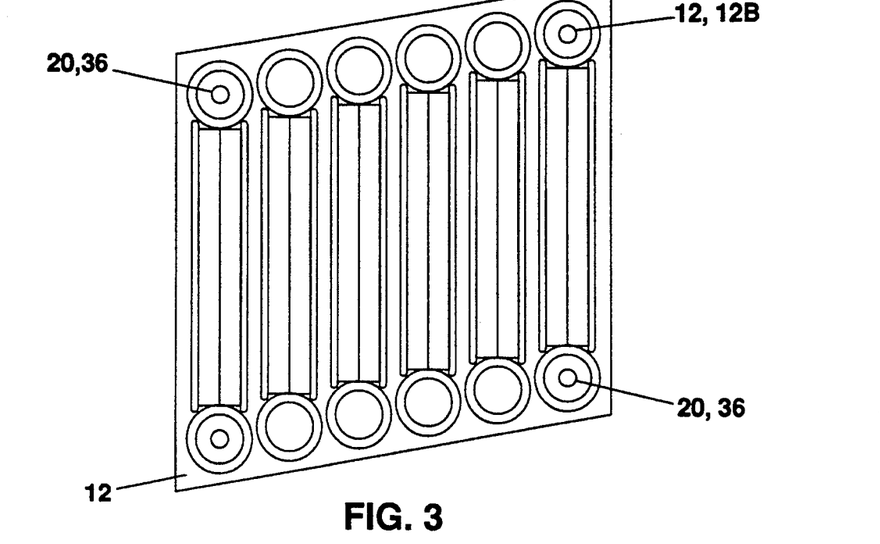
FIG. 3 is a top plan view of the device with a base member having a parallelogram shape.
Figure 4:
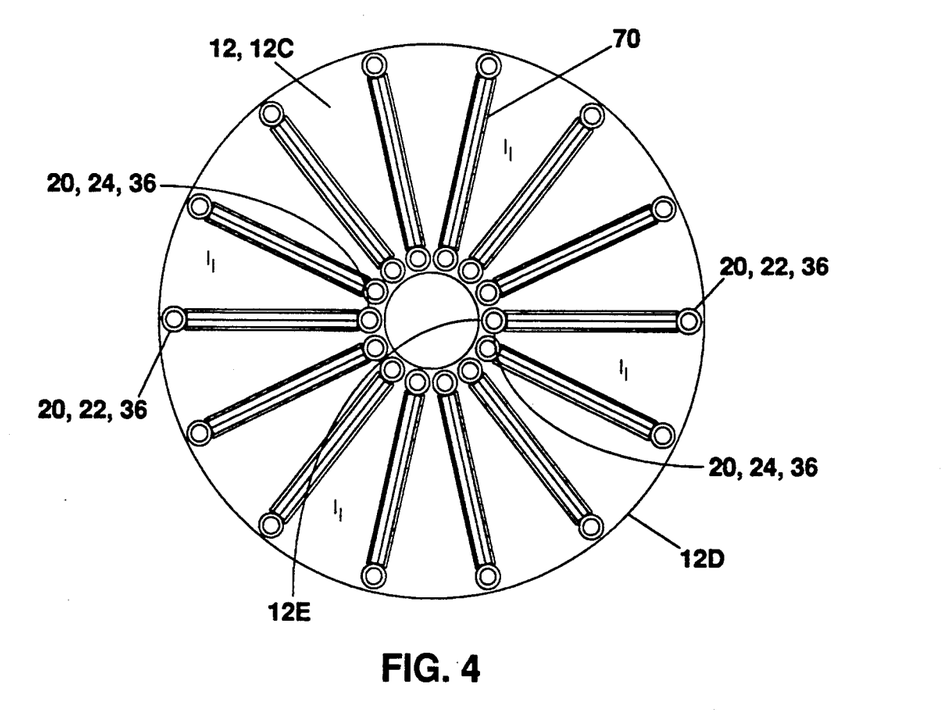
FIG. 4 is a top plan view of the device with a base member having a circular shape.

The preferred shape of the base member 12 is square or rectangular 12A as shown in FIGS. 1, 2, 5 and 6. However, other shapes such as a parallelogram 12B as shown in FIG. 3 or circular 120 as shown in FIG. 4 may be used.

When a circular shape is used the base member 12, 12C has an outer diameter 12D and a circumscribed inner diameter circle 12E. The first protective-case positioning member 22, which in this case has a circular cross-section 36, is located near the edge of the outer diameter 12D and tins second protective-case positioning member 24,36 is located opposite the first member 22 near tins edge of the inner diameter circle 12E. Opposite the second protective-case positioning member 24,36 near the opposite edge of the inner diameter circle 12E is located another second protective-case positioning member 24,36. Likewise, opposite the second members 24,36 is located near the edge of the outer diameter 12D a first protective-case positioning member 22,36. Thus, as shown in FIG. 4, a spoke-like pattern is formed that between each pair of members 22 and 24 is slideably aligned a protective case 70.

Figure 6:
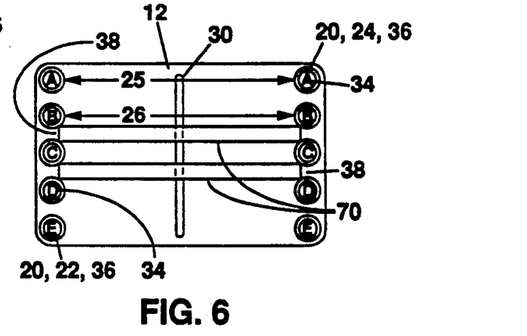
FIG. 6 is a top plan view or the device with a base member having a rectangular shape and with protective-case positioning members that ape spaced to form a recess between them.
Figure 7:
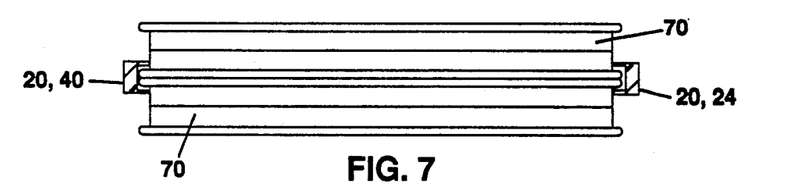
FIG. 7 is a partial top sectional view showing a pair of protective-case positioning members having an inwardly facing narrow channel cross-section.
Figure 8:
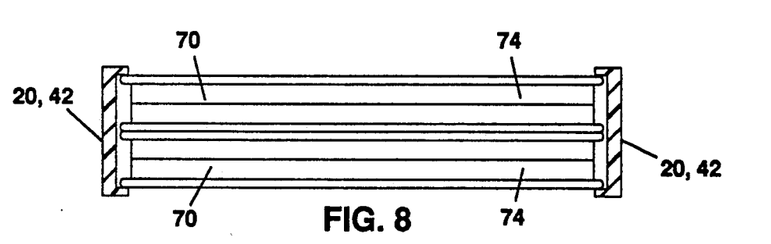
FIG. 8 is a partial top sectional view showing a pair of protective-case positioning members having an inwardly facing wide channel cross-section.
Figure 9:
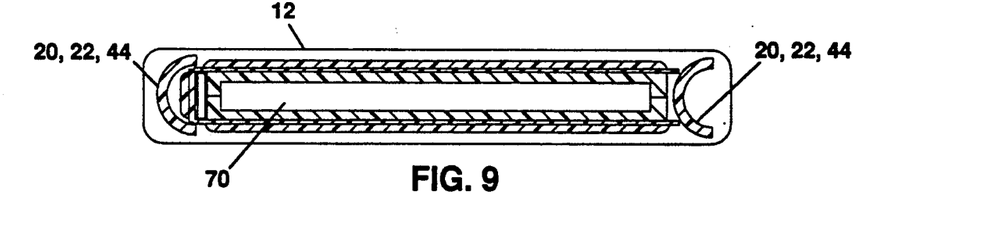
FIG. 9 is a partial top sectional view showing a pair of protective-case positioning member having semi-circular cross-sections.
Figure 10:
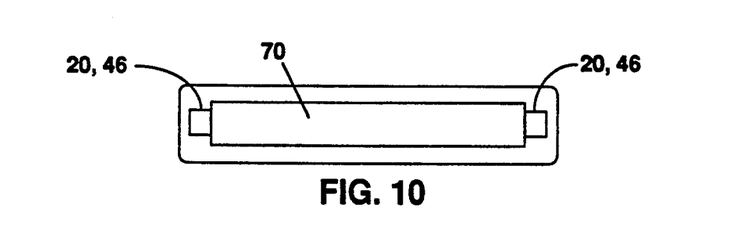
FIG. 10 is a top plan view of the device with a base member having attached a pair of protective-case positioning member having a square cross-section.

The upwardly extending protective-case positioning member 20 may be made in various cross-section configurations. These cross sections include but are not limited to: a circular cross section 36 as shown in FIGS. 1–6, a narrow channel cross-section 40 as shown in FIG. 7, a wide channel cross-section 42 as shown in FIG. 8, a semicircle cross-section 44 as shown in FIG. 9, or a square cross-section 46 as shown in FIG. 10.

The protective case 70 typically is slideably aligned by placing the case 70 between two oppositely facing protective-case positioning members 20 as shown in FIG. 5. Another method is shown in FIG. 6, where between a first set 25 of a first and second protective-case positioning members 22, 24 and a second set 26 of a first and second protective-case positioning members 22, 24 there is space which forms a recess 38 into which a protective case 70 can be slideably aligned. The protective-case positioning member may also be made with a narrow channel cross-section 40 as shown in FIG. 7. In this mounting scheme, the channels 40 of two members 20 face inwardly and the channel is sized to slideably align the two interfacing ends and sides 72 of two separate protective cases 70 having recessed edges. A variation of this mounting scheme is shown in FIG. 8, where the protective-case positioning member 20 have an inwardly facing wide channel cross-section 42 having an opening that is sized to slideably align the outer sides 74 of two side-by-side protective cases 70. Still another protective-case aligning method is shown in FIG. 9 where the first and second protective-case positioning members 20 have a semi-circular 44 cross section. In this mounting scheme, the concave section faces the convex section and the protective-case 70 is placed therein.

The above protective-case 70 slideably received structure include combinations of single protective-case positioning members 20 having single openings or channels. The members 20 may also be made with each member 20 consisting of integral structures that extend normal from the base member 12 as shown in FIGS. 11–15. Each of these structures have a series of continuous and aligned indentations that allow a protective case to be placed between the indentations and be releasably engaged.

Figure 11:
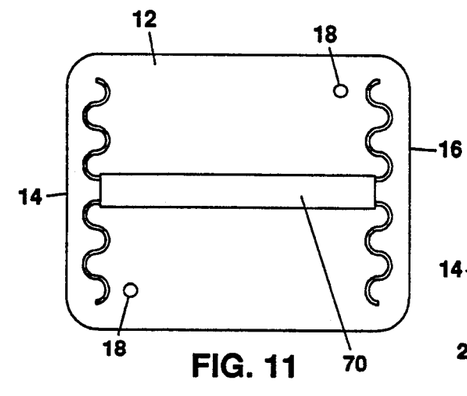
FIG. 11 is a top plan view of the device with a protective-case positioning member that consists of an integral structure having a series of continuous and aligned indentations in the form of a sinesoidal wave profile.
Figure 12:
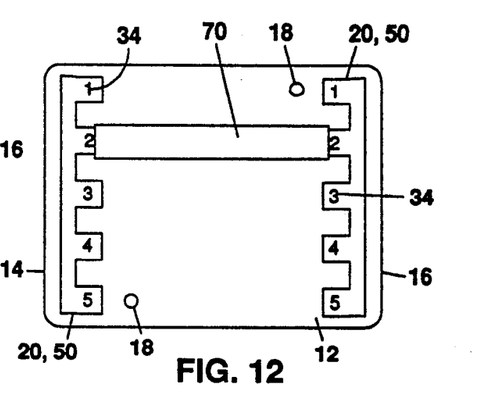
FIG. 12 is a top plan view of the device with a protective-case positioning member that consists of an integral structure having a series of continuous and aligned indentations in the form of a notched profile.
Figure 13:
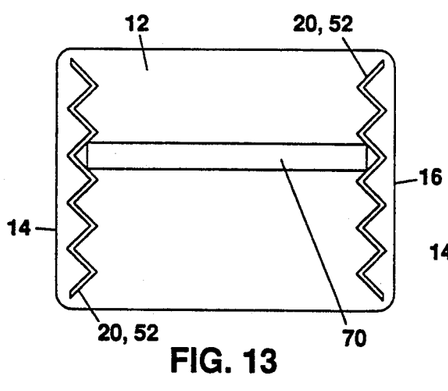
FIG. 13 is a top plan view of the device with a protective-case positioning member that consists of an integral structure having a series of continuous and aligned indentations in the form of a triangular profile.
Figure 14:
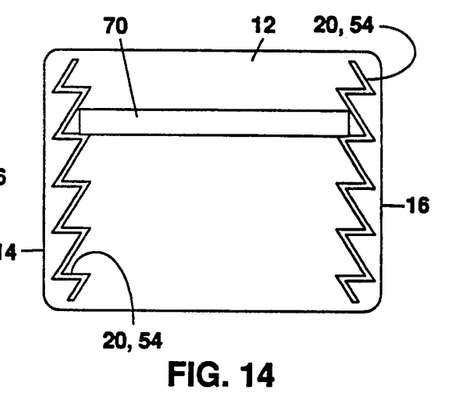
FIG. 14 is a top plan view of the device with a protective-case positioning member that consists of an integral structure having a series of continuous and aligned indentations in the form of a sawtooth profile.
Figure 15:
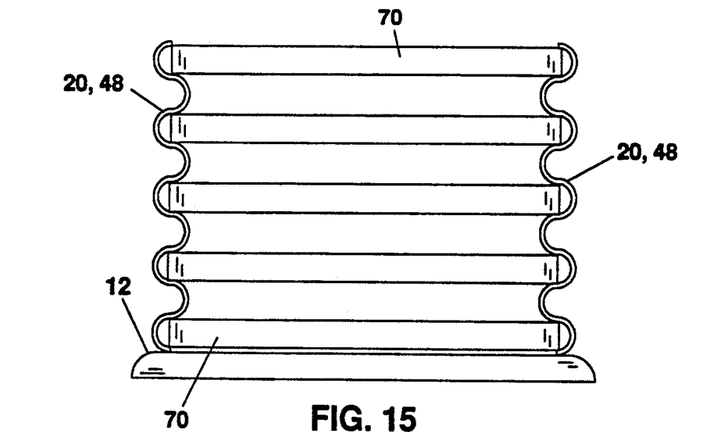
FIG. 15 is a front elevational view of the device with a protective case positioning member that consists of an integral structure having a series of continuous and aligned indentations and where the indentations are in parallel with the base member.

These indentations may be configured in the form of a sinesoidal wave profile 48 as shown in FIG. 11; in the form of a notched profile 50 as shown in FIG. 12; in the form of a triangular profile 52 as shown in FIG. 13 of in the form of a sawtooth profile 54 as shown in FIG. 14. Other profiles are of course available and function equally well. A variation of the multiple indentation integral structures is shown in FIG. 15 wherein the integral structures are aligned with the indentations 48 located in parallel with the base member 12. This configuration allows the protective cases 70 to be inserted and removed from either side of the device 10.

Figures 16, 17:
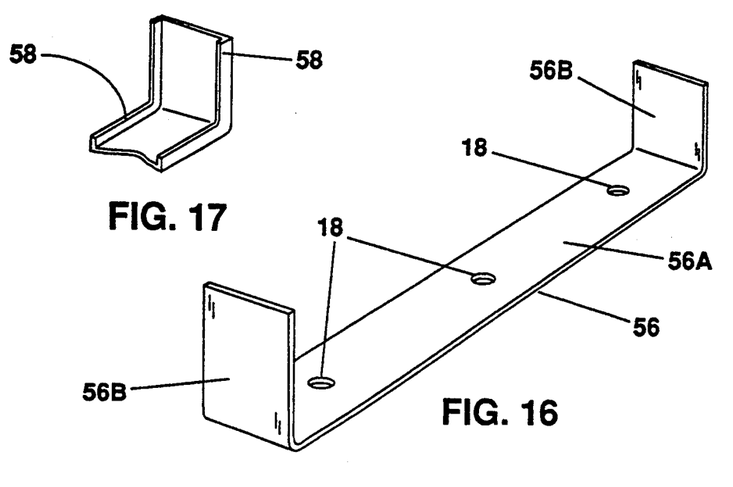
FIG. 16 is a perspective view of a protective-case positioning member comprising a horizontal section having on each end a vertically extending section that are spaced to allow a protective case to be releasably engaged between the two sections.
FIG. 17 is a partial perspective view of of the protective-case positioning member shown in FIG. 16 but that further comprises a contour that grasps the outer edges of the protective case.

Another method which may be utilized to slideably receive a protective case 70 is by a protective case U-shaped member 56 as shown in FIGS. 16 and 17. In this design, at least one such U-shaped member 56 is used where the clamp consists of a horizontal section 56A having on each end a contiguous, vertically extending section 568. The two vertical sections are spaced to allow a protective case 70 to be slideably received between the two sections 56B. As shown in FIG. 17, the U-shaped member 56 may be further enhanced by including a contour 58 that grasps the outer edges of the protective case 70.

In the previously disclosed devices 10, the protective-case positioning members 20 are designed to slideably received and align a protective case 70 by its external surfaces. The device 10 can also be designed with at least one protective-case positioning member 20 that extends vertically from the base member 12 as shown in FIGS. 18–21. The vertical member is sized to fit into a slot 80A located along the spine of a protective case 70,80 such as those produced by SyQuest ® Technology.

Figure 18:
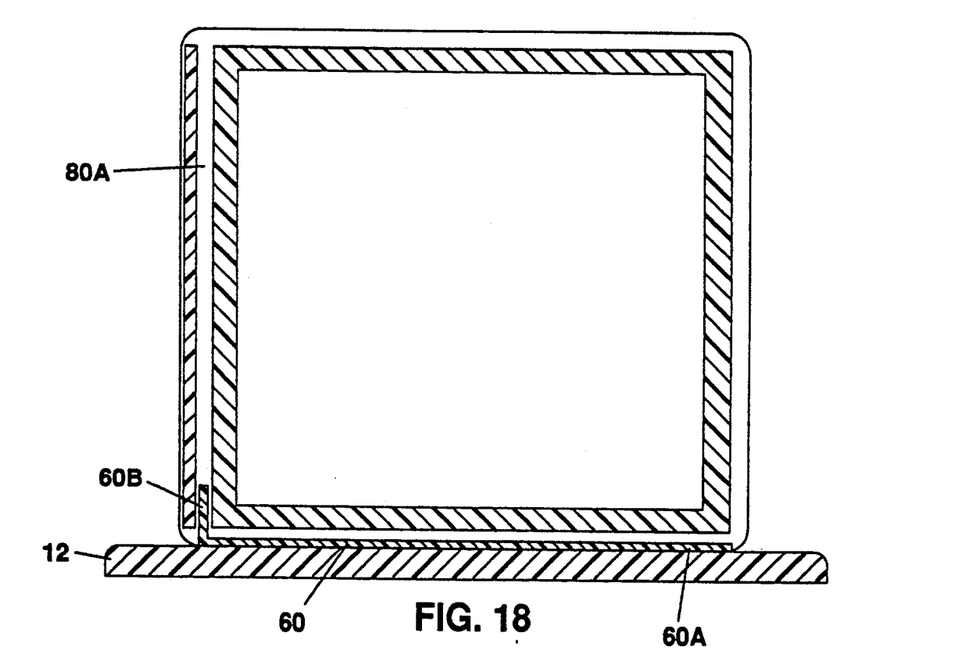
FIG. 18 is a side elevational view of the device with a protective-case positioning member that consists of an horizontal section that attaches to the base member and a vertical blade section that is sized to fit into a slot located along the spine of a protective case.
Figure 19:
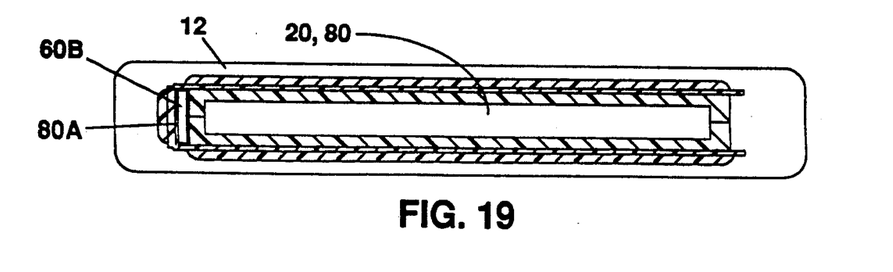
FIG. 19 is a top plan view of the device as shown in FIG. 18.
Figure 20:
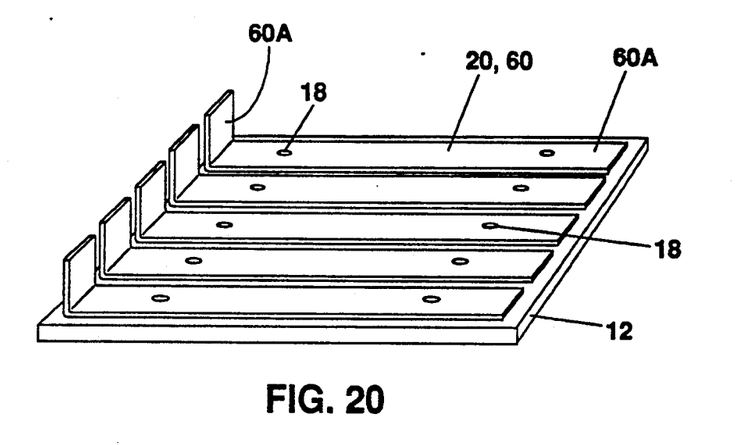
FIG. 20 is a perspective view of the device showing a plurality of the protective-case positioning member's comprising a horizontal section and a contiguous vertical section as also shown in FIG. 18.
Figure 21:
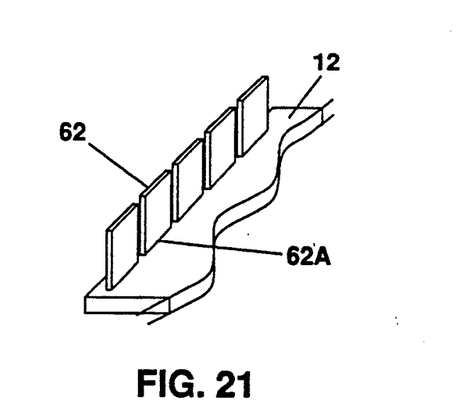
FIG. 21 is a partial perspective view of the device showing a plurality of protective-case positioning member's comprising vertical sections imbedded into the base members.

In one of these designs, as shown in FIGS. 18, 19 and 20, a protective-case spine catch 80 is used that consists of a horizontal section 60A and a contiguous vertical section 60B that extends from at least one end of the horizontal section. The horizontal section 60A is formed adjacent to the upper surface of the base member 12 and the vertical section(s) is sized to fit into a slot 80A located along the spine of a protective case 70,80 as best shown in FIG. 18. An alternative to this method is shown in FIG. 21 where a set of vertically extending section 62 are imbedded into slots 62A in the base member 12. As before, the sections 62 are sized to fit into the spine of the protective case 70,80.

In all of the above devices 10, the base member 12 may have a case ejecting slot 30 therethrough that allows the passage of a protective-case ejecting device 29. This device may be positioned and activated by a mechanical of an electronics means.

The final enhancements disclosed for the device 10 include: a transparent flexible pocket 32 located adjacent to at least one side of the outer surface of a protective case 70 as shown in FIG. 2. Into this pocket is inserted a alphanumeric coordinating index card 33. The card allows one or more protective cases engaged in the device to be alphanumerically organized. The card can also be used to list and/or describe the contends of each protective case. Additionally, an alphanumeric indicator 34 may be affixed to a cap that fits over a protective-case positioning member 20 as shown in FIG. 6, attached to an integral structure as shown in FIG. 12 or attached to the top surface of the protective cases 70.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claim:

1. A storing, organizing and retrieving device for protective cases enclosing optical or magnetic recording or recorded media, said protective cases having opposite sides that are similarly shaped, and said device comprising:

a) a base member, b) at least one first protective-case positioning member extending normal from the surface of said base member, c) at least one second protective-case positioning member extending normal from the surface and on the opposite side of said base member in alignment with said first protective-case positioning member and d) said first and second members have one or more protective-case alignment surface which is formed contiguously along a span of said members, and said members are spaced to allow opposites edges of one or more protective case to be slideably aligned between said alignment surfaces.

2. The device as specified in claim 1 wherein said base member is in a rectangular shape having a first edge and a parallel second edge, where said first protective-case positioning member is located near the first edge of said base member and the second protective-case positioning member is located opposite said first member near the second edge of said base member.

3. The device as specified in claim 1 wherein said base member is in a parallelogram shape having a first edge and a parallel second edge, and an adjacent third edge having a parallel fourth edge where neither of said third and fourth edges are perpendicular to said first or second edges and, where said first protective-case positioning member is located near the first edge of said base member and the second protective-case positioning member is located opposite said first member near the second edge of said base member.

4. The device as specified in claim q wherein said base member is in a circular shape having an outer diameter and a circumscribed inner diameter circle, where said first protective-case positioning member is located near the edge of the outer diameter and the second protective-case positioning member is located opposite said first protective-case positioning member near the edge of the circumscribed inner diameter circle, and where opposite the second protective-case positioning member near the opposite edge of the inner diameter circle is located another second protective-case positioning member and another first protective-case positioning member is located opposite said another second protective-case positioning member near the edge of the outer diameter.

5. The device as specified in claim 1 wherein a curved portion is defined by an adjoining contour of at least one protective-case positioning member to said base member and an area substantially internal to said curved portion further comprises at least one mounting bore that allows said base member to be attached to a horizontal or vertical surface by inserting a fastener through at least one said mounting bore.

6. The device as specified in claims 2, 3 or 4 wherein said first and second protective-case positioning members have a circular cross-section that allows a protective case to be slideably aligned between them.

7. The device as specified in claims 2, 3 or 4 wherein between a first set of said first and second protective-case positioning members and a second set of said first and second protective-case positioning members there is a space which forms a recess that allows a protective case to be slideably aligned.

8. The device as specified in claims 2, 3 or 4 wherein said first and second protective-case positioning members have an inwardly facing narrow channel cross-section having a channel that is sized to slideably align the two inwardly interfacing ends and sides of two separate protective cases.

9. The device as specified in claims 2, 3 or 4 wherein said first and second protective-case positioning members have an inwardly facing wide channel cross-section having an opening that is sized to slideably align the outer sides of two side-by-side protective cases.

10. The device as specified in claims 2, 3, or 4 wherein said first and second protective-case positioning members have a semi-circular cross-section positioned and sized to slideably align a protective case.

11. The device as specified in claim 1 wherein said first and second protective-case positioning members each consists of integral structures extending normal from said base member, with each said structure having a series of continuous and aligned indentations that allow a protective case to be placed between the indentations and be slideably aligned.

12. The device as specified in claim 11 wherein said indentations are configured in the form of a sinesoidal wave profile.

13. The device as specified in claim 11 wherein said indentations are configured in the form of a notched profile.

14. The device as specified in claim 11 wherein said indentations are configured in the form of a triangular profile.

15. The device as specified in claim 11 wherein said indentations are configured in the form of a sawtooth profile.

16. The device as specified in claim 11 wherein said integral structures are aligned with the indentations located in parallel with said base member to allow the protective cases to be inserted and removed from either side of said device.

17. The device as specified in claim 1 wherein said base member further having a case ejecting slot therethrough that allows the passage of a protective case ejecting device.

18. The device as specified in claim 17 wherein said protective case ejecting device is positioned and activated by an electronics means.

19. A storing, organizing and retrieving device for protective cases enclosing optical or magnetic recording or recorded media, said device comprising:

a) a base member, b) at least one protective-case positioning member consisting of a protective-case U-shaped member comprising a horizontal section having on each end a vertically extending section that are spaced to allow a protective-case to be slideably aligned between said vertically extending sections, and c) where said U-shaped member and the aligning surfaces thereof are contiguously formed.

20. The device as specified in claim 19 wherein said protective-case positioning member further comprises a contour that slideably aligns the outer edges of the protective case.

21. A storing, organizing and retrieving device for protective cases enclosing optical or magnetic recording or recorded media, said device comprising:

a) a base member, and b) at least one protective-case positioning member extending vertically from said base member where said vertical member is sized to fit into a slot located along the spine of a protective case.

22. The device as specified in claim 21 wherein said protective-case positioning member comprises a protective-case slot catch consisting of a horizontal section that is formed adjacent to the upper surface of said base member and a contiguous vertical section that extends from at least one end of said horizontal section and that is sized to fit into a slot located along the spine of a protective case.

23. The device as specified in claim 1 further comprising an alphanumeric indicator affixed to at least one of said protective-case positioning members.

24. The device as specified in claim 23 wherein the protective case further comprises a transparent flexible pocket adjacent to at least one side of its outer surface where into said pocket is inserted an alphanumeric co-ordinating index card for the purpose of alphanumerically organizing one or more protective cases to said alphanumeric indicator when each of said cases are aligned in said device.

* * * * *